July 23, 1935.  B. B. SMITH  2,008,843
AIRCRAFT
Filed Sept. 26, 1933   2 Sheets-Sheet 1
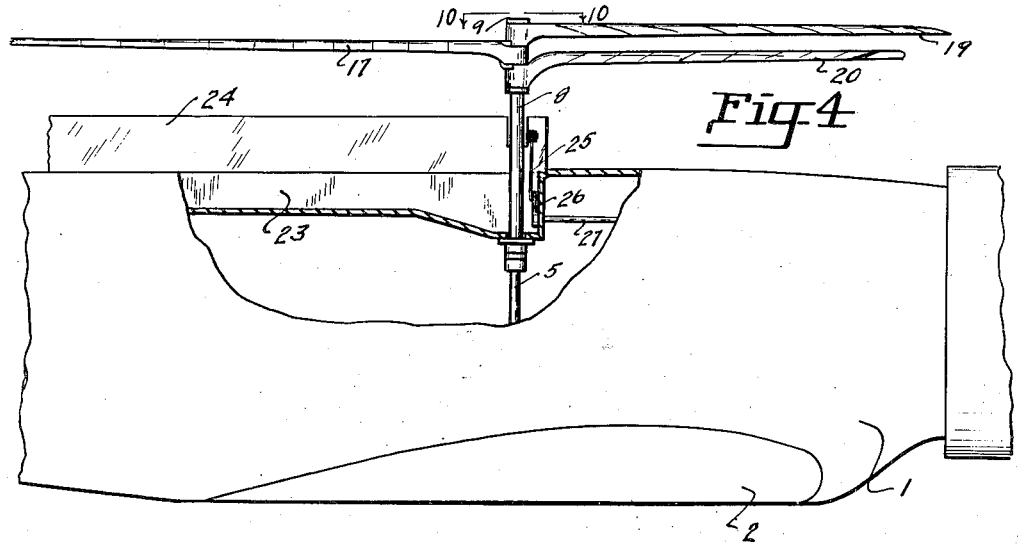
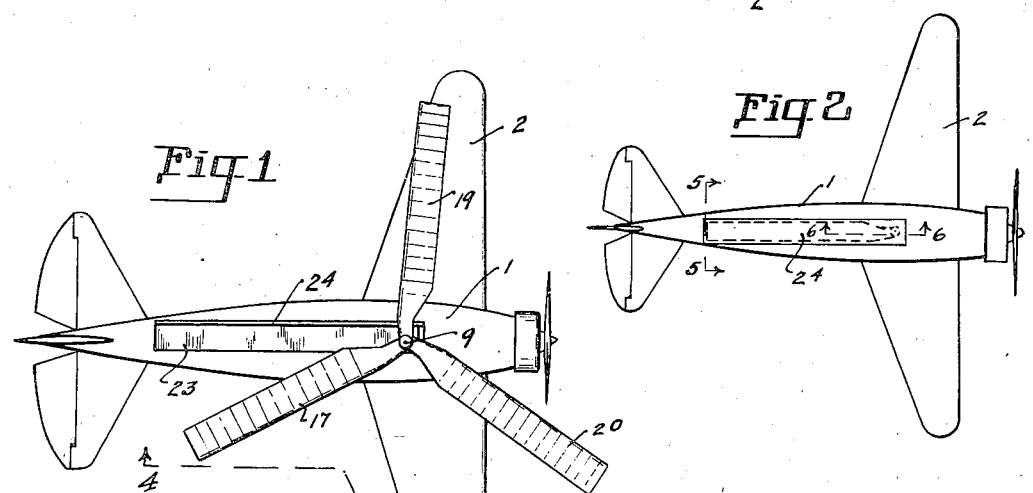
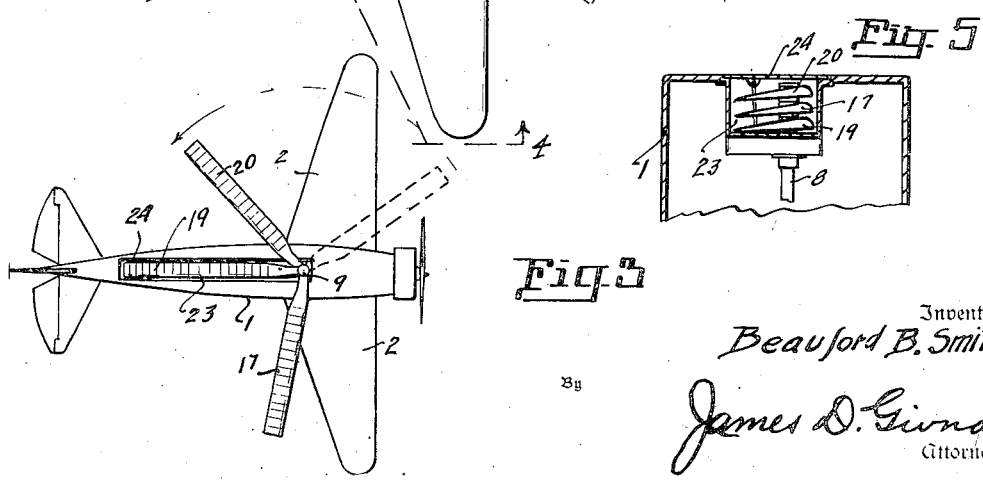
Inventor
Beauford B. Smith
By James D. Givnan
Attorney July 23, 1935. B. B. SMITH 2,008,843
AIRCRAFT
Filed Sept. 26, 1933 2 Sheets-Sheet 2
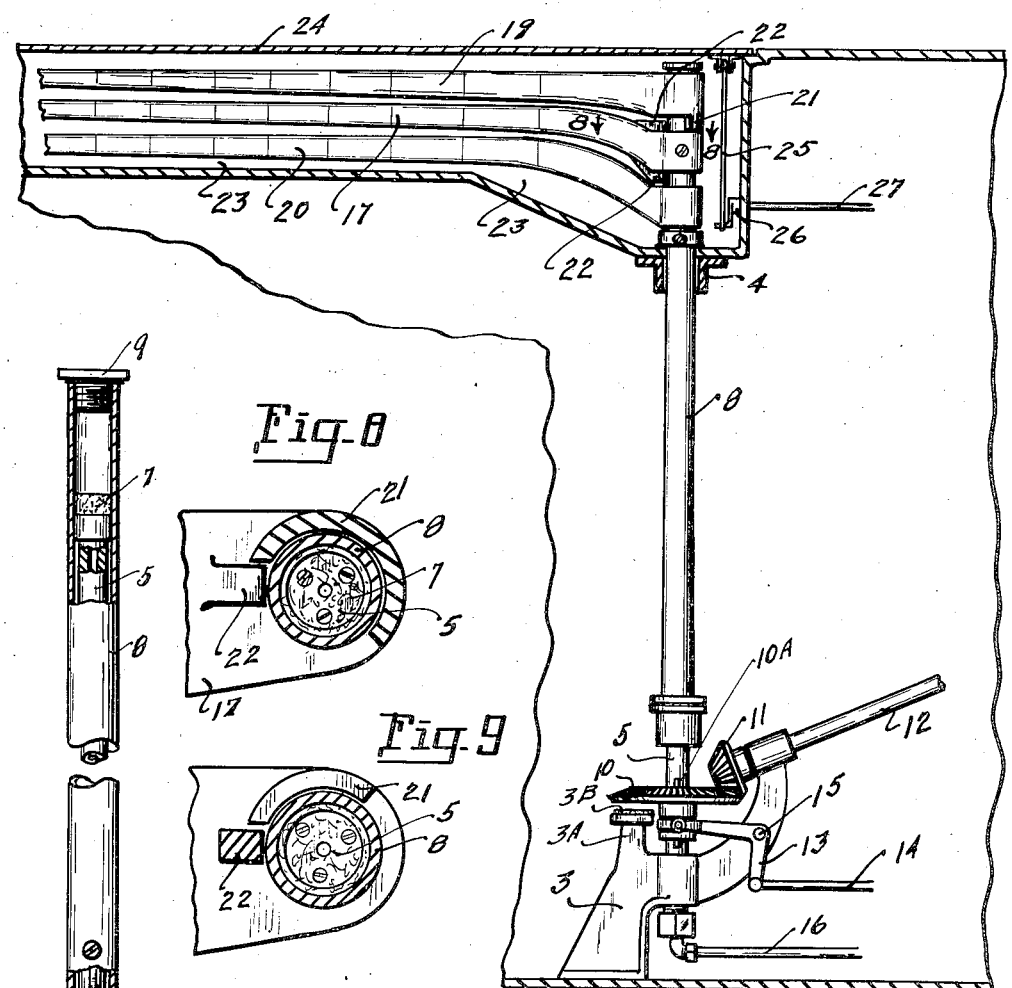
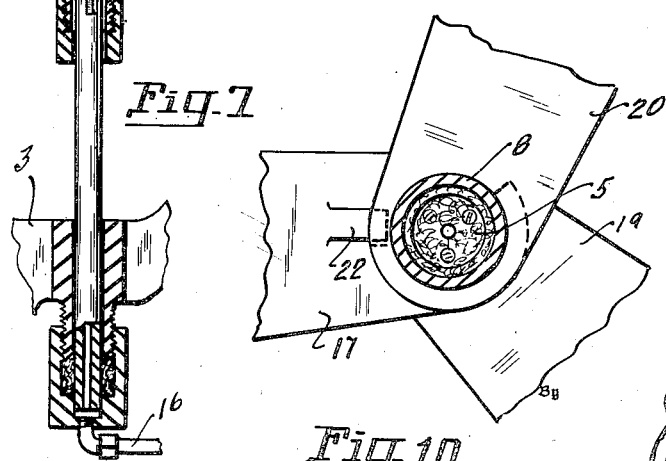
Inventor
Beauford B. Smith
James D. Givnan
Attorney Patented July 23, 1935

2,008,843

UNITED STATES PATENT OFFICE 2,008,843

AIRCRAFT

Beauford B. Smith, Silverton, Oreg.

Application September 26, 1933, Serial No. 690,979

6 Claims. (Cl. 244—19)

REISSUED
JUN 4 – 1940

This invention relates to improvements in air craft and more especially to the autogyro type of air craft wherein a plurality of rotating air foils are used to create lifting power for vertical and forward flight of the air craft.

One of the principal objects of the invention is to provide a mechanism of this character whereby the craft will have a high flying speed and a low landing speed.

Another object of the invention is the provision of a gyro mechanism of this character wherein the said air foils are mounted to a common drive shaft to which they are partially independently rotatably mounted and whereby the shaft engages the blades progressively one after another and automatically arranges them in equi-distant angular relationship to each other and also whereby said air foils will automatically release themselves for automatically positioning into a position of rest.

Another object of the invention is to provide a means whereby said air foils are collapsible to a position of rest wherein they are arranged one upon the other and in such position adapted to be housed within the stream line confines of the air craft body, thereby offering no parasite resistance whatever to the forward flight of the air craft.

Another object of the invention is the provision of automatic means for projecting the air foils from a position of rest within the fuselage of the air craft to an operative position above the air craft. By this same means the air foils may be readily retracted into an inoperative position and housed within the fuselage. In other words, for the take-off of the air craft, to which my invention is applied, it is merely necessary for the pilot to operate a control within the cockpit of the ship for releasing the air foils into operative position, whereupon they are caused to rotate by a mechanical means hereinafter described, to create maximum lifting power for causing a rapid ascension of the air craft.

Upon reaching a predetermined altitude the pilot of the air craft may then retract the air foils as aforesaid within the fuselage of the ship and then the relatively small wings of the air craft are alone used for straightaway flight. By this arrangement it is obvious that, due to the small wing area, my improved type of air craft is capable of a high rate of flying speed and a low rate of descent or landing speed.

These and other objects will appear as my invention is more fully hereinafter described in the following specification, illustrated in the accompanying drawings and finally pointed out in the appended claims.

In the drawings

Fig. 1 is a top plan view of my improved type of air craft showing my new and improved autogyro mechanism in operative engagement therewith.

Fig. 2 is a top plan view of an air craft showing the air foils of my autogyro collapsed and housed within the fuselage of the air craft.

Fig. 3 is a view similar to Figures 1 and 2 and showing the air foils in the process of assuming their inoperative positions for subsequent housing within the fuselage of the air craft.

Fig. 4 is an enlarged fragmentary sectional side elevation of Figure 1, taken on line 4—4 of Figure 1, and with parts broken away for convenience of illustration.

Fig. 5 is an enlarged fragmentary sectional view, taken on the line 5—5 of Figure 2.

Fig. 6 is an enlarged detailed view of the driving mechanism for the air foils themselves in inoperative position.

Fig. 7 is an enlarged detailed view of a pneumatic means for projecting and retracting said air foils with respect to the fuselage of the air craft.

Fig. 8 is an enlarged fragmentary sectional plan view, taken on the line 8—8 of Figure 6.

Fig. 9 is a similar view taken on the line 9—9 of Figure 6.

Fig. 10 is an enlarged fragmentary plan view taken on the line 10—10 of Figure 4.

Referring now more particularly to the drawings:

Reference numeral 1 indicates the main body or fuselage of an air craft having wings 2 extending outwardly from the side thereof in the usual manner. 3 and 4 indicate bearings securely mounted within the fuselage to rotatably support a hollow shaft 5. The shaft 5 is longitudinally bored as at 6 and provided at its uppermost end with a felt or leather piston 7 or any other approved form of piston. Surrounding the shaft 5 and slidably mounted thereon is a tubular housing 8 which extends upwardly beyond the bearing 4. The uppermost end of the housing 8 is provided with a cap 9 which contains a lubricating oil reservoir packed with felt or the like, which renders the same air-tight between the top or the shaft 5 and its inner and uppermost end. The housing 8 is rotatable with the shaft 5 through the medium of any suitable key mechanism but the housing is slidable vertically with respect to the shaft 5 by reason of an elongated key-way to permit of moving the housing 8 longitudinally of the shaft during rotation of the shaft 5. To the shaft 5, I secure a bevel gear 10 coacting with a driving pinion 11 which is secured to a drive shaft 12 whose opposite end is in operative engagement with the engine of the air craft. Associated with the bevel gear 10 is a bell crank 13 which is operable by means of an actuating rod 14 by means of which the gear 10 may be disengaged from the pinion 11 by rocking the bell crank around its pivot point 15.

The lowermost end of the longitudinally bored shaft 5 is connected by any suitable means to a pressure line 16 through which suitable pressure or suction may be directed through the shaft 5 and into the upper end of the housing 8 for projecting or retracting the same with respect to said shaft 5. Upon the upper end of the housing 8, I secure an air foil 17 by any suitable means such for instance as a pin 18 whereby said air foil is rotatable with said housing at all times. Above and below said anchored air foil, I provide companion air foils 19 and 20 which are rotatably mounted to the shaft through a predetermined degree of rotation but are provided with limit stops 21 for abutment with corresponding limit stops 22 formed on the central and anchored air foil 17 so that as said central air foil rotates with the shaft in one direction, it will progressively pick up the companion air foils 19 and 20 and likewise upon rotation in the opposite direction it will progressively release said air foils so that they may be swung by the slip stream or air incidental of flight around and over the body of the air craft. Within the upper wall of the fuselage of the air craft I provide a cavity 23 to form a housing, as aforesaid, and the air foils when they are in a position of rest are arranged one upon the other. The uppermost end of the cavity is provided with any suitable closure plate 24 shaped to correspond with the contour of the air craft body and hinged thereto along one of its edges by any suitable means. For convenience in opening and closing said closure plate I provide a link 25 connected at one of its ends to the underside of the closure plate 24 and at its opposite end to a crank arm 26 to which is secured an actuating rod 27 which extends to a point within convenient reach of the pilot of the air craft so that manipulation of the rod 27 will cause the closure plate to rapidly open to permit emergence of said air foils. This closure controlling mechanism, as aforesaid, is not sufficiently strong to overcome the projecting of the air foils through the closure in the case of a forced landing or the like, where sudden application of pressure applied to the housing 8 will instantly project said housing and said air foils up through the top of the cavity and in so doing swing the closure open against any resistance by the said controlling mechanism. As a modified form of closure fastening means I may provide a catch controllable from the cockpit and which may be swung out of locking engagement with the closure. I have not here shown this modified form of fastening means since I am aware that any approved form of such fastening means may be employed.

In connection with the bevel gear 10, it is to be noted that the gear is slidably mounted upon the shaft 5 by means of a key 10A, and operable with respect to the pinion 11 by means of the bell crank 13, as aforesaid.

Upon the bearing support 3 I form an upwardly extending projection 3A formed at its upper end with a brake shoe 3B arranged in the path of downward movement of the bevel gear 10, so that a prolonged pull on the rod 14 and bell crank 13 will cause the gear to wipe against the brake shoe to effect a braking action thereupon.

While I have shown a particular form of embodiment of my invention I am aware that many minor changes therein will readily suggest themselves to those skilled in the art without departing from the spirit and scope of the invention. Having thus described the invention, what I claim as new and desire to protect by Letters Patent is:

1. An air craft of the class described, comprising a fuselage, wings, an empennage and a power plant, a vertical shaft rotatably mounted within the fuselage and engageable with the power plant, a housing slidably mounted upon said shaft and rotatable therewith, said housing adapted to be projected from the interior of the fuselage to the exterior thereof, a plurality of air foils mounted upon the housing and adapted to be projected or retracted with said housing from the interior of the fuselage to the exterior thereof, one of said air foils being secured to the housing and the others being rotatably mounted upon the housing and means formed on said other of said air foils for becoming progressively engaged with the said secured air foil.

2. An air foil as in claim 1 including a cavity formed in the fuselage for receiving said air foils when in retracted position.

3. In an air craft having a fuselage, wings and an empennage, the combination of an extensible shaft rotatably mounted within the fuselage, a plurality of individual air foils mounted to the shaft for rotation therewith when said shaft is in an extended position, means on said shaft for progressively advancing said air foils into predetermined angular relation with each other for rotation with said shaft in an anti-clockwise direction in plan view.

4. In an air craft having a fuselage, wings and an empennage, the combination of a plurality of individual air foils mounted upon a drive shaft, means upon said shaft for arranging said air foils in operative position upon rotation of said shaft, and means for retracting said air foils in their collapsed position to a position of rest within the fuselage in the direction of its length.

5. In an air craft having a fuselage, wings and an empennage, the combination of a vertically disposed power driven shaft, a housing slidably and rotatably mounted upon said shaft and adapted to be driven thereby, means for projecting said housing above said fuselage and for retracting the housing to a position within the fuselage, an air foil secured at one of its ends to said housing, a plurality of companion air foils partially rotatably mounted upon said housing, co-operative limit stops formed on said first mentioned air foil and on the companion air foils for abutment with each other upon rotation of said housing to thereby spread said air foils into angular positions with respect to each other.

6. In an air craft having a fuselage, wings and an empennage, the combination of an extensible shaft rotatably mounted within the fuselage, a plurality of individual air foils carried by the extensible portion of the shaft, means for spreading said air foils into operative relation with each other upon rotation of the shaft in one direction.

BEAUFORD B. SMITH.